United States Patent
Zhu et al.

(10) Patent No.: US 6,645,280 B1
(45) Date of Patent: Nov. 11, 2003

(54) JET INK COMPOSITION FOR PRINTING WATERMARKS

(75) Inventors: Linfang Zhu, Naperville, IL (US); Christopher D. Peterson, Evanston, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 09/579,519

(22) Filed: May 26, 2000

(51) Int. Cl.[7] ............................................. C09D 11/00
(52) U.S. Cl. ................ 106/31.27; 106/31.36; 106/31.37; 106/31.4; 106/31.58; 106/31.49; 106/31.6; 106/31.86; 106/31.78; 106/31.68; 106/31.69; 106/31.72
(58) Field of Search .................... 106/31.27, 31.36, 106/31.37, 31.4, 31.58, 31.49, 31.6, 31.86, 31.78, 31.68, 31.69, 31.72

(56) References Cited

U.S. PATENT DOCUMENTS

| | | | |
|---|---|---|---|
| 3,622,362 A | * 11/1971 | Coney et al. ............. 106/31.37 |
| 3,642,507 A | * 2/1972 | Olhoft et al. ........... 106/169.13 |
| 3,985,927 A | 10/1976 | Norris et al. ................ 428/211 |
| 5,674,923 A | 10/1997 | Subbaraman et al. |
| 5,755,860 A | * 5/1998 | Zhu ......................... 106/31.15 |
| 5,785,746 A | * 7/1998 | Kito et al. ................ 106/31.86 |
| 5,826,916 A | 10/1998 | Phillips ........................ 283/91 |
| 5,847,024 A | 12/1998 | Newman et al. ............. 523/161 |
| 6,010,564 A | * 1/2000 | Zhu et al. ................. 106/31.37 |
| 6,210,472 B1 | * 4/2001 | Kwan et al. ............. 106/31.14 |
| 6,478,861 B1 | * 11/2002 | Kwan et al. ............. 106/31.14 |

FOREIGN PATENT DOCUMENTS

| DE | 198 32 878 | 7/1999 |
|---|---|---|
| JP | 58-108189 | 6/1983 |

OTHER PUBLICATIONS

"SAIB—Sucrose Acetate Isobutyrate", Eastman, Sep. 1994, pp. 1–19.

* cited by examiner

*Primary Examiner*—Helene Klemanski
*Assistant Examiner*—Veronica F. Faison
(74) *Attorney, Agent, or Firm*—Leydig, Voit & Mayer, Ltd.

(57) ABSTRACT

The present invention provides a jet ink composition suitable for printing watermarks on paper substrates. The jet ink composition comprises a solvent and a translucentizing agent. An example of a translucentizing agent is sucrose acetate isobutyrate. The present invention further provides a method of ink jet printing watermark on an object comprising projecting a stream of droplets of the ink composition and controlling the direction of the stream so that the droplets form the watermark on the object. The method of the present invention has the advantage that it provides high speed watermarking capability. The method provides a further advantage that it is economical in changing the design of watermarks. The method is versatile and allows changes in the design of watermarks to be incorporated readily.

35 Claims, No Drawings

JET INK COMPOSITION FOR PRINTING WATERMARKS

TECHNICAL FIELD OF THE INVENTION

The present invention pertains to ink jet ink compositions in general, and in particular, to an ink jet ink composition that is useful in printing watermarks on paper substrates.

BACKGROUND OF THE INVENTION

It is often desirable to include watermarks in stationeries, business forms, and other papers. Advantages of watermarks are many. For example, a trademark can be placed on the paper in the form of a watermark to identify the paper manufacturer. Watermarks also can be provided to contain coded information relating to the dates of manufacture or the composition of the paper. As watermarks generally do not reproduce on photocopying machines, they can serve as document authenticating tools.

Watermarks are traditionally created by processes involving the use of mechanical means. For example, a watermark can be produced during the paper-making process by compressing the wet paper fibers between rolls having a raised design such as a design containing letters or drawings. After the compression is completed, the paper fibers are dried. The compression of the fibers displaces a significant amount of the air trapped in the fibers and renders the compressed region thinner, denser, and more transparent than the uncompressed region. Such processes have many disadvantages, for example, they use heavy machinery or do not allow frequent changes in the design of watermarks. To change the design of a watermark, the compression rolls may have to be changed, which can be laborious and expensive. Further, as small orders cannot be processed readily, to make it economically worthwhile, customers desiring to have a stationery watermarked are often required to place large orders.

Other processes for creating watermarks have been proposed, for example, by the use of printing inks. JP 58108189 A discloses a watermark printing method. The abstract of this patent application describes the purpose of the method as follows: "To obtain easily a paper with a transparent pattern, having processability even in small amounts, by a method in which printing is performed on paper by using an SAIB solution while heating and then heated further." "SAIB" herein refers to sucrose acetate isobutyrate. U.S. Pat. No. 3,985,927 discloses "compositions and method for producing chemical watermarks in finished paper products, the watermarks being produced by applying to the surface of the paper a synthetic resin composition having a chemical grouping therein capable of being insolubilized upon exposure to high frequency radiation, and thereafter exposing the resin composition to such high frequency radiation to insolubilize the resin," (abstract). U.S. Pat. No. 5,847,024 discloses a watermark ink "composed of a drying oil modified polyester, an aluminum alkoxide gelling agent and an ultraviolet light absorber" (abstract). The preferred ink has a viscosity of at least 150 poise (column 3, lines 21–22). According to Example 2 of the '024 patent, the ink is applied to the substrate by wet lithography.

Many of the known methods are cumbersome or difficult to practice as, e.g., they involve multiple steps or use heat or ultraviolet radiation. The printing speed also may not be high in some of these methods. The watermarks printed by some of these methods are also unstable to heat or light.

Thus, there exists a need for a method for providing watermarks at high speeds. There further exists a need for a method for providing watermarks which allows frequent changes in the design of the watermark. There also exists a need for ink compositions that can be employed to print watermarks at high speeds. There also exists a need for ink compositions capable of printing watermarks that are stable to heat and/or light.

The advantages of the present invention, as well as additional inventive features, will be apparent from the description of the invention provided herein.

BRIEF SUMMARY OF THE INVENTION

The foregoing needs have been fulfilled to a great extent by the present invention which provides a jet ink composition suitable for printing watermarks on paper substrates. The jet ink composition comprises a solvent and a translucentizing agent. The present invention further provides a method for printing watermarks on a substrate such as paper, the method comprising projecting a stream of droplets of the ink composition and controlling the direction of the stream so that the droplets form an image on the substrate. The method of the present invention has an advantage that the printing speed is high. The method is versatile and allows changes in the design of watermarks to be readily incorporated. The watermarks have good contrast and are stable to heat and light.

While the invention has been described and disclosed below in connection with certain embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

The present invention provides a jet ink composition that is suitable for printing watermarks on paper substrates. The watermarks have excellent contrast on paper substrates. The watermarks do not bleed or yellow upon aging. The present invention also provides a method for printing watermarks on paper substrates. The watermark is usually viewed under light transmitted through the paper, preferably substantially perpendicular to the paper. When viewed in this manner, the watermark appears lighter than the unmarked area.

The jet ink composition of the present invention comprises a solvent and one or more translucentizing agents. The translucentizing agent makes the paper less opaque, and thus forms a visible image on the paper when viewed under light.

The jet ink composition of the present invention can be employed in continuous or drop on demand ink jet printers. When used in a continuous ink jet (CIJ) printer, the jet ink composition has (1) a viscosity of from about 1.6 to about 10.0 centipoises (cP) at 25° C.; (2) an electrical resistivity of from about 50 to about 2000 ohm-cm; and/or (3) a sonic velocity of from about 1100 to about 1700 meters/second. When used in a drop on demand ink jet printer, the viscosity of the ink composition can be up to about 50 cP or more and preferably from about 3.0 cP to about 30 cP at 25° C.

Any suitable translucentizing agent can be used. The translucentizing agent preferably has a refractive index close, e.g., within about ±0.1–0.3 refractive index units, and more preferably within about ±0.1 refractive index unit, to that of the paper substrate, particularly to that of cellulose. Cellulose has a reported refractive index of 1.54. Typically, the translucentizing agent has a refractive index of from about 1.3 (±0.05) to about 1.7, and preferably from about 1.4 to about 1.6, at 20° C. The translucentizing agent preferably has good thermal and light stability, e.g., without bleeding or a significant change in color. The translucentizing agent preferably has hydrolytic stability, e.g., it does not degrade when exposed to heat and moisture. The translucentizing agent preferably has a low moisture absorbance, e.g., not more than that of paper.

The translucentizing agent preferably has low volatility, e.g., a weight loss of about 5% or less, and preferably about 2% or less when heated at 171° C. for 50 hours. The translucentizing agent preferably does not seep out of the watermark with time. The translucentizing agent preferably has good penetration into paper substrates.

The translucentizing agent can be one or more high molecular weight materials, one or more low molecular weight materials, or a combination thereof. Typically, the high molecular weight material has a weight average molecular weight of less than 50,000, and preferably from about 2,000 to about 40,000. Typically, the low molecular weight material has a weight average molecular weight of less than 2000, and preferably from about 500 to about 1500. The lower molecular weight material can be a liquid or solid, and the high molecular weight material is typically a solid, at ambient temperatures (20±3° C.)

Any suitable low molecular weight material can be used, e.g., a sugar, a resin, or a derivative thereof. An example of a sugar derivative is a derivative of a mono-, di-, or tri-saccharide, and preferably a disaccharide such as a sucrose derivative. Preferably, the sugar derivative is soluble in one or more solvents present in the jet ink composition.

The sugar can be derivatized to include a suitable group. The derivatization can adjust the solubility, affinity to cellulose, refractive index, thermal stability, UV or visible light stability, and/or diffusivity. Thus, e.g., a sugar molecule can be derivatized to include an ester group of a carboxylic acid having about 1–6 carbon atoms, preferably 2–4 carbon atoms. The carboxylic acid can be linear or branched. Examples of sugar derivatives include sucrose esters such as acetate, propionate, n-butyrate, isobutyrate, and combinations thereof. Mixed esters such as sucrose acetate isobutyrate (SAIB) are preferred. The sugar derivatives can be prepared by methods known to those skilled in the art, e.g., esterification of the sugar by the use of an acid anhydride or acid chloride. The sugar molecule can also be derivatized to include an ether group of an alkyl alcohol having about 1–6 carbon atoms, preferably 2–4 carbon atoms. The alcohol can be linear or branched.

SAIB is available from Eastman Chemical Co. in Kingsport, Tenn. as a 90% solution in ethanol. SAIB provides one or more advantages. SAIB is a liquid with relatively low volatility. The material has good thermal stability and light stability. The material has a very light color, less than 1 on Gardner color scale, and does not yellow upon aging. SAIB has a refractive index of 1.454. SAIB provides good watermark contrast, good paper penetration, and good color and contrast stability relative to aging.

The use of SAIB also provides certain additional benefits in the operation of CIJ printers, especially in binary array CIJ printers. The viscosity of inks used in binary array CIJ printers is generally about 10 cP or less, typically about 7 cP or less, and more typically about 5 cP or less. SAIB provides increased non-volatile content at ink application viscosities. In embodiments of the ink composition, the use of high concentrations of SAIB provides increased contrast. The use of SAIB in the ink composition provides good performance, e.g., with low maintenance, in CIJ printers, particularly in binary array CIJ printers.

Examples of other low molecular weight materials include polymers or resins. Examples of such materials include ketone resins, cellulose derivatives, silicone resins, alkyd resins, polyesters, polyamides, polyvinyl butyral resins, polyurethanes, formaldehyde/alkyl benzenesulfonamide resins, hydrocarbon resins including saturated hydrocarbon resins, acrylic resins including homopolymers and copolymers containing acrylic and/or non-acrylic comonomers, phenolic resins, and combinations thereof. Ketone resins are preferred. Examples of ketone resins include the Synthetic Resin SK and Synthetic Resin AP which are available from Creanova Inc. in Somerset, N.J. In embodiments of the ink composition, a combination of two low molecular weight materials, e.g., a sugar derivative and a ketone resin, can be used.

The high molecular weight material provides an advantage that it helps to reduce or eliminate bleeding due to certain low molecular weight materials from the watermark. Bleeding can lead to loss of resolution and/or contrast. Advantageously, a combination of a high molecular weight material and a low molecular weight material is used to minimize bleeding and/or improve resolution.

Any suitable high molecular weight material can be used, e.g., a polymer or resin is used. Examples of high molecular weight materials include ketone resins, cellulose derivatives, silicone resins, alkyd resins, polyesters, polyamides, polyvinyl butyral resins, polyurethanes, formaldehyde/alkyl benzenesulfonamide resins, hydrocarbon resins including saturated hydrocarbon resins, acrylic resins including homopolymers and copolymers containing acrylic and/or non-acrylic comonomers, phenolic resins, and combinations thereof. Cellulose derivatives are preferred. Examples of cellulose derivatives include cellulose esters, preferably cellulose mixed esters such as cellulose acetate butyrate and cellulose acetate propionate. Cellulose acetate butyrate and cellulose acetate propionate are available from Eastman Chemical Co. as CAB 551-0.01 and CAP 504-0.2, respectively.

The jet ink composition includes one or more translucentizing agents in a suitable amount. For example, the low molecular weight translucentizing agent can be present in an amount of up to about 60% by weight, preferably from about 5% by weight to about 60% by weight, and more preferably from about 5% to about 40% by weight of the jet ink composition. The high molecular weight translucentizing agent can be present in an amount of up to about 40% by weight, preferably from about 1% by weight to about 40% by weight, and more preferably from about 5% to about 25% by weight of the jet ink composition.

The jet ink composition of the present invention includes a solvent, preferably an organic solvent. It is further preferred that the jet ink composition includes one or more slow evaporating solvents. The use of slow evaporating solvents provides an advantage that the watermark is not glossy. Any suitable slow evaporating solvent can be used. The solvent evaporation rate can be determined by methods known to those skilled in the art, e.g., by the ASTM Method No. D-3539. The solvent can have an evaporation rate of less than n-butyl acetate which has a standard evaporation rate of 1.0, as determined by the ASTM Method No. D-3539. Preferably, the slow evaporating solvent has an evaporation rate of 0.5 or less, and more preferably less than 0.2. For example, the slow evaporating solvent can preferably have an evaporation rate of from about 0.01 to about 0.5 and more preferably from about 0.01 to about 0.2. Examples of slow evaporating solvents include N-methyl pyrrolidone, glycol ethers such as butyl cellosolve, and diacetone alcohol. Mixtures of two or more slow evaporating solvents can also be used.

The jet ink composition includes the one or more slow evaporating solvents in a suitable amount. For example, the slow evaporating solvent can be present in an amount of up to about 70% by weight, preferably from about 5% by weight to about 70% by weight, and more preferably from about 15% to about 40% by weight of the jet ink composition.

The jet ink composition of the present invention also includes one or more fast evaporating solvents. Fast evaporating solvents help achieve rapid drying of the printed image. Any suitable fast evaporating solvent can be used. For example, the solvent can have an evaporation rate greater than n-butyl acetate, preferably an evaporation rate of from 1.0 to about 7.0, and more preferably from about 1.5 to about 7.0. Examples of fast evaporating solvents include ketones, alcohols, ethers, esters, and combinations thereof, preferably lower ketones, alcohols, ethers, or esters, and combinations thereof. Particular examples of preferred fast evaporating solvents include acetone and ethanol. Mixtures of acetone and ethanol also can be used.

The fast evaporating solvent can be used in any suitable amount. For example, the fast evaporating solvent or solvents, individually or in combination, can be present in an amount of up to about 90% by weight, preferably up to about 80% by weight, and more preferably from about 30% by weight to about 70% by weight of the jet ink composition.

The jet ink composition may further contain one or more additives that improve and/or contribute to the ink performance, e.g., conductivity agents. Examples of suitable conductivity agents include a lithium salt, e.g., lithium nitrate and lithium trifluoromethanesulfonate, and potassium or ammonium salts such as potassium or ammonium isothiocyanate. The conductivity agent is usually present in an amount of from about 0.1% by weight to about 5.0% by weight, and preferably from about 0.3% by weight to about 2% of the jet ink composition.

The jet ink composition of the present invention can include one or more binder resins. Binder resins typically improve the adhesion of the components of the composition to the substrate. Any suitable binder resin can be used. For example, the high molecular weight translucentizing agents can serve as a binder resin. Particular examples of binder resins include ketone resins and cellulose derivatives.

In an embodiment, the present invention provides a jet ink composition comprising one or more fast evaporating solvents, a co-solvent which is less volatile than n-butyl acetate, one or more high molecular weight translucentizing agents, one or more low molecular weight translucentizing agents, and a conductivity agent. For example, the present invention provides a jet ink composition wherein the one or more fast evaporating solvents are present in an amount of up to about 90% by weight, the co-solvent is present in an amount of from about 5% to about 70% by weight, the one or more high molecular weight translucentizing agents may be present in an amount of from 0% to about 40% by weight, the one or more low molecular weight translucentizing agents are present in an amount of from about 5% to about 60% by weight, and the conductivity agent is present in an amount of from about 0.1% to about 5% by weight of the jet ink composition.

The jet ink composition is free or substantially free of a colorant such as a pigment, dye, or lake. However, a colorant can be included if desired, e.g., when printing on colored paper substrates. Alternatively, a fluorescent dye or a fluorescent brightener can be included to produce a fluorescent watermark. The jet ink composition of the present invention can include one or more additives, e.g., plasticizers, antioxidants, and/or UV absorbers.

The jet ink composition of the present invention is stable, e.g., the ink composition does not settle or cause sedimentation and is jettable in an ink jet printer. The printed image is colorless or nearly colorless and has good contrast when printed on the substrate. The watermark has a visually appealing look on both sides of the paper substrate. The watermark is not shiny. The watermark is stable upon aging. The watermark does not bleed; further, it remains colorless. The watermark is compatible with various downstream processes such as laser printing, ink jet printing, or photocopying that the watermarked paper substrates may undergo.

The present invention further provides a method of ink jet printing watermark on an object comprising projecting a stream of droplets of the ink composition of the present invention and controlling the direction of the stream so that the droplets form an image on the object. The droplets can be deposited on the paper at a rate of 1–6 droplets/spot, and preferably at 2–4 droplets/spot. The operation of ink jet printers is generally known in the art. For example, various aspects of ink jet printing can be found in these publications: Kuhn et al., *Scientific American,* April, 1979, 162–178; and Keeling, *Phys. Technol.,* 12(5), 196–203 (1981). Various ink jet apparatuses are described in the following U.S. Pat. Nos.: 3,060,429, 3,298,030, 3,373,437, 3,416,153, and 3,673,601.

The method of the present invention allows printing watermarks at high speeds, e.g., up to a speed of 1200 ft. per minute, preferably up to about 1000 ft. per minute, and more preferably 800 ft. per minute. The method of the present invention is suitable for carrying out small print runs. The design of the watermarks can be changed readily. Binary array type continuous ink jet printers are especially suited for printing watermarks due to their high speed, high resolution, and graphic capability. Watermark images can be created with a suitable software and electronically stored in a computer. The computer can be used to control an ink jet printer so that the stored watermark designs can be changed and printed quickly.

The following examples further illustrate the present invention but, of course, should not be construed as in any way limiting its scope.

EXAMPLE 1

This example illustrates an embodiment of the ink composition of the present invention. The following ingredients are combined and mixed to obtain a jet ink composition.

| Materials | Weight % |
| --- | --- |
| N-Methyl pyrrolidone (ISP Technologies) | 20.0 |
| Acetone, 99% (Ashland) | 10.0 |
| Ethanol (Duplicating Fluid #5, anhydrous, Eastman Chemical Co.) | 40.0 |
| SAIB-90 (90% sucrose acetate isobutyrate in ethanol; Eastman Chemical Co.) | 10.0 |
| Synthetic Resin SK (ketone resin, Creanova Inc.) | 19.4 |
| Lithium nitrate (FMC Corp.) | 0.6 |
| Total | 100.0 |

The jet ink composition has a viscosity of 3.67 cP and an electrical resistivity of 1437 ohms/cm at 25° C. The jet ink is employed in a CIJ printer to print a watermark on paper at a rate of 4 droplets/spot. The watermark shows good contrast, and does not bleed or yellow upon accelerated aging.

EXAMPLE 2

This example illustrates another embodiment of the ink composition of the present invention. The following ingredients are combined and mixed to obtain a jet ink composition.

| Materials | Weight % |
|---|---|
| N-Methyl pyrrolidone (ISP Technologies) | 26.5 |
| Acetone, 99% (Ashland) | 22.7 |
| Ethanol (Duplicating Fluid #5, anhydrous, Eastman Chemical Co.) | 18.3 |
| SAIB-90 (90% sucrose acetate isobutyrate in ethanol; Eastman Chemical Co.) | 12.3 |
| Synthetic Resin SK (ketone resin, Creanova Inc.) | 19.5 |
| Lithium nitrate (FMC Corp.) | 0.7 |
| Total | 100.0 |

The jet ink composition has a viscosity of 3.46 cP and an electrical resistivity of 1202 ohms/cm at 25° C. The jet ink is employed in a CIJ printer to print a watermark on paper at a rate of 4 droplets/spot. The watermark shows good contrast, and does not bleed or yellow upon accelerated aging. The ink also is able to print high quality watermarks in a binary array printer such as the PRINTPRO ES™ printer from Marconi Data Systems Inc.

All references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. An ink composition comprising a slow evaporating solvent and a translucentizing agent, wherein the ink composition is free or substantially free of colorants and is suitable for use in ink jet printing on paper substrates, and the slow evaporating solvent is present in an amount of from about 15% by weight to about 70% by weight of the ink composition.

2. The ink composition of claim 1, which has (1) a viscosity of from about 1.6 to about 10.0 centipoises at 25° C.; (2) an electrical resistivity of from about 50 to about 2000 ohm-cm; or (3) a sonic velocity of from about 1100 to about 1700 meters/second.

3. The ink composition of claim 1, wherein the translucentizing agent has a refractive index of from about 1.3 to about 1.7.

4. The ink composition of claim 3, wherein the translucentizing agent has a refractive index of from about 1.4 to about 1.6.

5. The ink composition of claim 3, wherein the translucentizing agent comprises a high molecular weight material, a low molecular weight material, or a combination thereof.

6. An ink composition comprising a slow evaporating solvent and a translucentizing agent, wherein the ink composition is free or substantially free of colorants and is suitable for use in ink jet printing on paper substrates, and the slow evaporating solvent is present in an amount of from about 5% to about 70% by weight of the ink composition, and the translucentizing agent comprises a low molecular weight material which is a sugar derivative.

7. The ink composition of claim 6, wherein the sugar derivative is a sucrose derivative.

8. The ink composition of claim 7, wherein the sucrose derivative is a sucrose ester.

9. The ink composition of claim 8, wherein the sucrose ester is a sucrose acetate isobutyrate.

10. The ink composition of claim 5, wherein the high or low molecular weight material comprises a polymer.

11. The ink composition of claim 5, wherein the high or low molecular weight material is selected from the group consisting of ketone resins, cellulose derivatives, silicone resins, alkyd resins, polyesters, polyamides, polyvinyl butyral resins, polyurethanes, formaldehyde/alkyl benzene-sulfonamide resins, hydrocarbon resins, acrylic resins, phenolic resins, and combinations thereof.

12. The ink composition of claim 5, wherein the high or low molecular weight material is selected from the group consisting of ketone resins and cellulose derivatives.

13. The ink composition of claim 12, wherein the cellulose derivatives are cellulose esters.

14. The ink composition of claim 1, wherein the slow evaporating solvent has an evaporation rate of less than 1.0 relative to n-butyl acetate which has a standard evaporation rate of 1.0.

15. The ink composition of claim 14, wherein the slow evaporating solvent is selected from the group consisting of N-methyl pyrrolidone, glycol ethers, diacetone alcohol, and combinations thereof.

16. The ink composition of claim 1, which includes one or more fast evaporating solvents.

17. The ink composition of claim 16, wherein the fast evaporating solvent is selected from the group consisting of ketones, alcohols, ethers, esters, and combinations thereof.

18. The ink composition of claim 1, which includes a conductivity agent.

19. The ink composition of claim 1, which includes a fluorescent agent.

20. A jet ink composition comprising one or more fast evaporating solvents, a co-solvent which is less volatile than n-butyl acetate, one or more high molecular weight translucentizing agents, one or more low molecular weight translucentizing agents, and a conductivity agent.

21. The jet ink composition of claim 20, wherein the one or more fast evaporating solvents are present in an amount of up to about 90% by weight, the co-solvent is present in an amount of from about 5% to about 70% by weight, the one or more high molecular weight translucentizing agents are present in an amount of up to about 40% by weight, the one or more low molecular weight translucentizing agents are present in an amount of from about 5% to about 60% by weight, and the conductivity agent is present in an amount of from about 0.1% to about 5% by weight of the jet ink composition.

22. A method of ink jet printing watermark on an object comprising projecting a stream of droplets of the ink composition of claim 1 and controlling the direction of the stream so that the droplets form an image on the object.

23. The jet ink composition of claim 20, further including a fluorescent agent.

24. An ink composition comprising a slow evaporating solvent and a translucentizing agent, wherein the ink composition has a viscosity of up to about 50 cps at 25° C., is free or substantially free of colorants, and is suitable for use in ink jet printing on paper substrates, and the slow evaporating solvent is present in an amount of from about 15% by weight to about 70% by weight of the ink composition.

25. An ink composition comprising a solvent and a translucentizing agent which is a low molecular weight sugar derivative, wherein the ink composition is free or substantially free of colorants and is suitable for use in ink jet printing on paper substrates.

26. An ink composition comprising a slow evaporating solvent and a translucentizing agent, wherein the ink composition is free or substantially free of colorants and is suitable for use in ink jet printing on paper substrates, and the slow evaporating solvent is present in an amount of from 20% to about 70% by weight of the ink composition.

27. An ink composition comprising a slow evaporating solvent and a translucentizing agent, wherein the ink composition is free or substantially free of colorants and is suitable for use in ink jet printing on paper substrates, and the slow evaporating solvent is present in an amount of from about 15% to about 40% by weight of the ink composition.

28. A method of ink jet printing watermark on an object comprising projecting a stream of droplets of the ink composition of claim 24 and controlling the direction of the stream so that the droplets form an image on the object.

29. A method of ink jet printing watermark on an object comprising projecting a stream of droplets of the ink composition of claim 25 and controlling the direction of the stream so that the droplets form an image on the object.

30. A method of ink jet printing watermark on an object comprising projecting a stream of droplets of the ink composition of claim 26 and controlling the direction of the stream so that the droplets form an image on the object.

31. A method of ink jet printing watermark on an object comprising projecting a stream of droplets of the ink composition of claim 27 and controlling the direction of the stream so that the droplets form an image on the object.

32. The ink composition of claim 5, wherein the low molecular weight material is a sugar.

33. An ink composition comprising a slow evaporating solvent and a translucentizing agent, wherein the ink composition is free or substantially free of colorants and is suitable for use in ink jet printing on paper substrates, and the slow evaporating solvent is present in an amount of from about 5% to about 70% by weight of the ink composition, and the translucentizing agent comprises a low molecular weight material which is a sugar or sugar derivative.

34. The jet ink composition of claim 20, wherein a low molecular weight translucentizing agent is a sugar.

35. A method of ink jet printing watermark on an object comprising projecting a stream of droplets of the ink composition of claim 33 and controlling the direction of the stream so that the droplets form an image on the object.

* * * * *